United States Patent [19]

Bauer

[11] Patent Number: 4,693,961

[45] Date of Patent: Sep. 15, 1987

[54] PHOTOPOLYMERIZABLE COATING AGENT, A PHOTOPOLYMERIZABLE MATERIAL AND ITS USE

[75] Inventor: Sigrid Bauer, Paudex, Switzerland

[73] Assignee: Ciba-Geigy Corporation, Ardsley, N.Y.

[21] Appl. No.: 849,994

[22] Filed: Apr. 10, 1986

Related U.S. Application Data

[60] Division of Ser. No. 691,713, Jan. 14, 1985, Pat. No. 4,601,973, which is a continuation-in-part of Ser. No. 503,445, Jun. 13, 1983, abandoned.

[30] Foreign Application Priority Data

Jun. 24, 1982 [CH] Switzerland .......................... 3885-82

[51] Int. Cl.$^4$ ............................................. G03C 5/00
[52] U.S. Cl. .................... 430/325; 430/280; 430/311; 430/330
[58] Field of Search ............... 430/325, 311, 280, 330

[56] References Cited

U.S. PATENT DOCUMENTS

| | | | |
|---|---|---|---|
| 3,674,545 | 7/1972 | Strolle | 204/159.15 X |
| 3,776,729 | 12/1973 | Levy et al. | 430/280 |
| 3,816,281 | 6/1974 | Feinberg | 430/280 X |
| 3,956,043 | 5/1976 | Zahir et al. | 156/3 |
| 3,989,610 | 11/1976 | Tsukada et al. | 430/280 X |
| 4,169,732 | 10/1979 | Shipley | 96/35.1 |
| 4,308,185 | 12/1981 | Evans et al. | 525/63 X |
| 4,399,241 | 8/1983 | Ting et al. | 525/63 X |
| 4,482,671 | 11/1984 | Woo et al. | 525/65 X |

FOREIGN PATENT DOCUMENTS

| | | |
|---|---|---|
| 1448643 | 9/1976 | United Kingdom . |
| 2032939 | 5/1980 | United Kingdom . |

*Primary Examiner*—John E. Kittle
*Assistant Examiner*—Cynthia Hamilton
*Attorney, Agent, or Firm*—Luther A. R. Hall

[57] ABSTRACT

A photopolymerizable coating agent made of (a) a low molecular weight epoxy-containing epoxy resin, (b) a high-molecular weight epoxy resin based on aromatic polyols and epichlorohydrin, (c) a light-sensitive ethylenically unsaturated monomer having terminal ethylene groups and (d) a photoinitiator and/or sensitizer, and, if desired, hardeners for epoxy resins. It is used for preparing temporary or permanent protective coatings and photographic relief images.

11 Claims, No Drawings

PHOTOPOLYMERIZABLE COATING AGENT, A PHOTOPOLYMERIZABLE MATERIAL AND ITS USE

This is a divisional of application Ser. No. 691,713, filed on Jan. 14, 1985, now U.S. Pat. No. 4,601,973, issued on July 22, 1986, which in turn is continuation-in-part of application Ser. No. 503,445, filed June 13, 1983, now abandoned.

The present invention relates to a photopolymerizable coating agent prepared from a low molecular weight and a high molecular weight epoxy resin, a polyfunctional ethylenically unsaturated monomer having terminal ethylene groups and a photoinitiator, to a photopolymerizable material in which a support has been coated with this agent, and to the use of the material.

Because of their good mechanical, thermal and chemical stability, epoxy resins are used in the electronics industry in the form of photocrosslinkable resins, for example as photoresists or protective coatings. For instance, U.S. Pat. No. 3,956,043 discloses a photosensitive epoxy resin which which contains the photosensitive group in the molecule with which good results can be obtained. However, the relatively slow crosslinking reaction upon exposure, caused by the excessively high absorption of the epoxy resin itself, is considered a disadvantage.

Photocrosslinkable coating compositions based on reaction products of monoethylenically unsaturated carboxylic acids and bisphenol and/or novolak epoxy resins are also known, cf. for example European Patent Application No. 0,003,040, German Offenlegungsschrift No. 2,459,179 and British Patent Application No. 2,032,939. These coating compositions show, however, various disadvantages. The epoxy (meth)acrylates used are relatively unstable, need to be inhibited against thermal polymerization and can be stored only in dilute solution for prolonged periods of time. Their preparation is uneconomical because of long reaction times, and their light-sensitivity is relatively low. Photoresist masks produced with them are brittle and have poor adhesion to copper.

It is an object of the present invention to provide light-sensitive coating compositions based on epoxy resins which do not show the disadvantages mentioned above.

The present invention relates to a photopolymerizable coating agent which comprises
  (a) at least one uncured epoxy resin based on a bisphenol or a novolac and epichlorohydrin, having an epoxide value of 0.2 to 0.5 equivalents per kg of resin and a mean molecular weight of 1,000 to 10,000.
  (b) at least one uncured epoxy resin based on a bisphenol or a novolac and epichlorohydrin, having a mean molecular weight of 20,000 to 60,000, the weight ratio of a:b being from 9:1 to 3:1.
  (c) at least one light-sensitive, polyethylenically unsaturated monomer having terminal ethylene groups, and
  (d) at least one photoinitiator or at least one sensitizer or a mixture of at least one photoinitiator and at least one sensitizer.

If desired, the coating agent can also contain customary additives.

The coating agent of the invention can be used as such or in the form of a solution in an organic solvent, where the concentrations in the solution conveniently are 5 to 80%, preferably 5 to 60% by weight of components (a) to (d) and 95 to 20%, preferably 95 to 40% by weight of solvent.

Suitable organic solvents are polar solvents, in particular polar aprotic solvents, which can be used alone or in mixtures of at least two solvents. Examples of suitable solvents are ethers, such as diethyl ether and dibutyl ether, tetrahydrofurane, dioxane, methyl ethylene glycol, dimethyl ethylene glycol, dimethyl diethylene glycol, diethyl diethylene glycol, dibutyl diethylene glycol or dimethyl triethylene glycol, halogenated hydrocarbons, such as methylene chloride, chloroform, carbon tetrachloride, 1,2-dichloroethane, 1,1,2-trichloroethane or 1,1,2,2-tetrachloroethane, carboxylates and lactones, such as propylene carbonate, ethyl acetate, methyl propionate, ethyl benzoate, ethyl glycol acetate, 2-methoxyethyl acetate, γ-butyrolactone, γ-valerolactone or mevalolactone, sulfoxides, such as dimethyl sulfoxide or tetramethyl sulfoxide, sulfones, such as dimethyl sulfone, diethyl sulfone, trimethylene sulfone or tetramethylene sulfone, ketones, such as dimethyl ketone, methyl ethyl ketone, methyl isobutyl ketone or cyclohexanone, and substituted benzenes, such as chlorobenzene or nitrobenzene.

The epoxy resins preferred are those based on bisphenols with epichlorohydrin. The novolaks can be composed of substituted or unsubstituted phenols, for example xylenol, cresol, resorcinol or, in particular, phenol, and aldehydes, in particular formaldehyde. The bisphenols can be represented by the following formula:

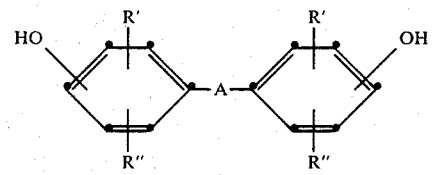

The hydroxyl groups can be in m-position or, in particular, in p-position, R' and R" in this formula can be alkyl having 1 to 6 C atoms, halogen, such as chlorine or bromine, or, in particular, hydrogen atoms. A can be a direct bond or

substituted or unsubstituted alkylidene, cycloalkylidene or alkylene.

Examples of substituted or unsubstituted alkylidene are ethylidene, 1,1- or 2,2-propylidene, 2,2-butylidene, 1,1-isobutylidene, pentylidene, hexylidene, heptylidene, octylidene, dichloroethylidene and trichloroethylidene. Examples of substituted or unsubstituted alkylene are methylene, ethylene, phenylmethylene, diphenylmethylene and methylphenylmethylene. Examples of cycloalkylidene are cylopentylidene, cyclohexylidene, cycloheptylidene and cyclooctylidene.

Examples of bisphenols are: bis(p-hydroxyphenyl)ether or thioether, bis(p-hydroxyphenyl)sulfone, bis(p-hydroxyphenyl)methane, 1,2-bis(p-hydroxyphenyl)ethane, phenyl-bis(p-hydroxyphenyl)methane, diphenyl-bis(p-hydroxyphenyl)-methane, diphenylbis(p-hydroxyphenyl)methane, 2,2-bis(4'-hydroxy-3',5'-dimethylphenyl)propane, 1,1- or 2,2-bis(p-hydroxyphenyl)butane, 1,1-dichloro or 1,1,1-trichloro-2,2-bis(p-hydroxyphenyl)ethane, 1,1-bis(p-hydroxyphenyl)cyclopentane and, in particular, 2,2-bis(p-hydroxyphenyl)propane (bisphenol A) and 1,1-bis(p-hydroxyphenyl)cyclohexane (bis-phenol C).

The epoxy resins are known and commercially available. The epoxy resin (a) preferably has an average molecular weight of 1,000 to 6,000 and, in particular, of 2,000 to 5,000. The softening ranges of the epoxy resins (a) are generally between 80° C. and 120° C., preferably between 90° C. and 110° C.

The epoxy resins (b) preferably have an average molecular weight of 25,000 to 55,000. They have very low contents of epoxy groups and can therefore hardly be cured by themselves.

It is also possible to make concomitant use of other customary epoxy resins. These can have higher epoxide values, for example of 1 to 6, preferably 1 to 4, equivalents per kg of resin. The amount can be, for example, 1 to 30% by weight, preferably 1 to 20% by weight, based on the epoxy resin (a).

The preferred unsaturated monomers are those which are capable of reacting under the influence of actinic radiation, in particular UV light. They contain at least two, preferably 2 to 4, terminal ethylene groups. An example of a group of such monomers are vinyl esters, such as divinyl succinate, divinyl adipate, divinyl terephthalate, butane-1,4-divinyl sulfonate or benzene-1,4-divinyl sulfonate.

In particular, the amides and esters of acrylic acid and methacrylic acid and aliphatic, cycloaliphatic and aromatic polyamines or polyols are preferred. Examples of polyamines are ethylene diamine, propylene diamine, butylene diamine, hexylene diamine, phenylene diamine, benzylene diamine, naphthylene diamine, diethylene triamine, triethylene tetramine and diamino ethyl ether. Examples of polyols are linear or branched alkylene diols, such as ethylene diol, propylene diol, butylene diol, pentylene diol, hexylene diol, octylene diol, polyoxaalkylene diols, such as diethylene or triethylene glycol or polyethylene glycols having a molecular weight of 200 to 500, 1,4-dihydroxycyclohexane, 1,4-di(hydroxymethyl)cyclohexane, dihydroxybenzenes, hydroxymethylphenols, triols, such as 1,2,3-trihydroxypropane, 1,2,4-trihydroxybutane, trimethylolpropane, pentaerythritol and dipentaerythritol. Preferably, the unsaturated monomer (c) is an acrylate or methacrylate of a polyol, more particularly an aliphatic or cycloaliphatic diol, such as pentaerythritol and trimethylolpropane. Most preferably, the unsaturated monomer (c) is 1,1,1-trimethylolpropane triacrylate or trimethacrylate.

The monomers (c) are preferably used in such amounts that the weight ratio of the epoxy resins (a) and (b) to the monomer (c) is 1:9 to 9:1, preferably 1:9 to 7:3, in particular 4:6 to 6:4. The choice of weight ratio depends essentially on the application intended.

The coating agent of the invention also contains a photoinitiator and/or a sensitizer, preferably in amounts of 0.1 to 10, in particular 1 to 5, % by weight, based on the monomer (c). These substances are known. Examples are α-halogenoacetophenones, benzils, benzoins or ethers thereof, benzophenones (Michler's ketone), benzil acetals, anthraquinones, thioketones, thioxanthones, acridines, phenazines, 2,4,5-triphenylimidazolyl dimers in the presence of hydrogen donors and dye/redox systems. Specific examples of sensitizers are bromoform, chloranil, 2,4-dinitrotoluene, styryl compounds and triphenylmethane dyes.

The coating agent of the invention is prepared in a known manner by mixing the components with one another in suitable mixing vessels, if desired in the presence of solvents. In the course of the mixing, customary additives can be incorporated, for example delustrants, flow-control agents, finely divided fillers, flame retardants, antioxidants, stabilizers, dyes, pigments or tackifiers.

The coating agent of the invention is a slightly to highly viscous liquid which has a long shelf life, high light-sensitivity and a broad processing spectrum. It is particularly suitable for preparing protective or passivating coatings and for use as a photographic recording material, for preparing photomasks, solder masks and insulating masks, for the preparation of chemical milling resists, electroplating resists, printed circuits, integrated circuits, printing plates, in particular offset printing plates, duplicating films and colour-proofing films. It can also be used as a screen-printing resist.

The coating agent can be applied by customary methods, such as dipping, brushing, spraying, roller-, cascade- or curtain-coating or screen-printing, to suitable support materials, for example plastics, metals, metal alloys, semi-metals, semiconductors, glass, ceramic materials, wood, quartz or silicon nitride. The layer thickness depends on the intended use and can vary from 1 $\mu$m to 60 $\mu$m. The photocrosslinkable material thus prepared and its use as a photographic recording material for relief images are also part of the subject matter of the present invention.

Solvents used in the coating step are afterwards removed by heating with or without reduced pressure. The coatings thus obtained may not be entirely tack-free, depending on the composition, and the surface can thereby be contaminated with dust, making contact exposure impossible. In such cases it is advisable to preexpose the surface before further processing. This gives dry and tack-free coatings.

The coated material is then subjected to imagewise exposure through a photomask. Afterwards the image can be fixed by heat-treatment before it is developed with suitable solvents.

This way it is possible to prepare permanent or, in particular, temporary protective coatings and images which can be removed once they have performed the intended, protective function.

Permanent coatings and images are prepared by advantageously mixing the coating agent of the invention with a hardener customary for epoxy resins, if desired together with a hardening accelerator. It was found that the unexposed areas of the coating agents of the invention cannot be completely hardened by thermal means in the presence of a hardener, for example dicyanodiamide. Surprisingly, it is observed, however, that the exposure-crosslinked areas solidify upon heating, and it is hence possible to harden by means of heat the image areas produced on imagewise exposure, and subsequently to develop the image. It is also possible to perform the in-depth hardening after development. The hardeners and, if desired, hardening accelerators are generally used in amounts of 0.1 to 10% by weight, preferably 0.5 to 5% by weight, based on the epoxy resin (a). Preferably, the hardeners are selected from the group consisting of dicyanodiamide, polybasic carboxylic acids and their anhydrides, for example of phthalic anhydride, $\Delta^4$-tetrahydrophthalic anhydride, hexahydrophthalic anhydride, 4-methylhexahydrophthalic anhydride, 3,6-endomethylene-Δ⁴-tetrahydrophthalic anhydride, 4-methyl-3,6-endomethylene-Δ⁴-tetrahydrophthalic anhydride (=methylnadic anhydride), 3,4,5,6,7-hexachloro-3,6-endomethylene-Δ⁴-tetrahydrophthalic anhydride, succinic anhydride, adipic anhydride, trimethyladipic anhydride, azelaic anhydride, sebacic anhydride, maleic anhydride, decenylsuccinic anhydride, pyromellitic dianhydride and mixtures of the said hardeners and mono-, di- or tri-ethanolamine, and said hardeners are used alone or together with a hardening accelerator.

Examples of suitable hardening accelerators are urea derivatives, such as chlorotolurone, phosphoric acid, and imidazoles, such as 2-ethyl-4-methylimidazole.

It was found to be particularly advantageous to use a polymer containing acid groups as a second hardener. On coating they give dry and tack-free surfaces, a significant benefit for subsequent processing. The polymers containing acid groups preferably have acid values of 10 to 500, in particular 20 to 200, mg of KOH/g of polymer. They are preferably used in such amounts that at most 1 equivalent, preferably 0.45 to 0.75 equivalent, of acid groups is used per equivalent of epoxide groups. They can have mean molecular weights of, for example, 2,000 to 100,000, preferably 5,000 to 80,000, in particular 10,000 to 50,000.

These polymers are for example polyesters derived from aliphatic, cycloaliphatic and aromatic dicarboxylic acids and polyols, containing terminal carboxyl groups. Furthermore, they can be homopolymers or co-polymers of ethylenically unsaturated acids and ethylenically unsaturated comonomers. Examples of suitable acids are vinylsulfonic acid and, in particular, acrylic acid, methacrylic acid and maleic acid. Examples of suitable comonomers are α-olefines, such as ethylene, propylene, n-butylene, isobutylene, pentylene or hexylene, vinyl halides, such as vinyl chloride, vinyl bromide, vinyl fluoride, tetra-fluoroethylene or vinylidene chloride, aromatic vinyl compounds, such as styrene, methylstyrene, vinyltoluene or α-chlorostyrene, heterocyclic vinyl compounds, such as vinylpyrrolidone, vinylcarbazole, vinylpyridine or vinylimidazole, vinyl ketones, such as methyl vinyl ketone, vinyl esters, such as vinyl acetate, vinyl ethers, such as vinyl methyl ether, allyl compounds and vinyl glycidyl ethers, and also, if desired, dienes, such as butadiene, chlorobutadiene, isoprene or chloroprene.

A preferred group of comonomers are derivatives of α,β-unsaturated carboxylic acids, for example of acrylic acid, methacrylic acid, crotonic acid, maleic acid or fumaric acid, dicarboxylic anhydrides, such as maleic anhydride, α,β-unsaturated nitriles, such as acrylonitrile, methacrylonitrile or crotononitrile, α,β-unsaturated carboxamides, such as acrylamide, methacrylamide or crotonamide, and α,β-unsaturated carboxylates, such as methyl acrylate, ethyl acrylate, propyl acrylate, butyl acrylate, pentyl acrylate, hexyl acrylate, octyl acrylate, 2-ethylhexyl acrylate, isopropyl acrylate, isobutyl acrylate and the analogous methacrylates and crotonates. Copolymers with maleic anhydride can also be used directly as additional hardeners. Examples of polymers which contain acid groups and consist of two or more monomers are poly[alkyl(meth)acrylate/(meth)acrylic acid], poly[alkyl(meth)acrylate(I)/alkyl(meth)acrylate(II)/(meth)acrylic acid], poly[styrene/alkyl(methacrylate)/(meth)acrylic acid], poly[styrene/(meth)acrylic acid], poly[styrene/maleic anhydride] and acid-esters and acid-amides thereof, wherein the alkyl groups preferably have 1 to 4 carbon atoms, and polymaleic anhydride and part-esters and part-amides thereof.

Poly[methyl](meth)acrylate/(meth)acrylic acid, poly[methyl](meth)acrylate/butyl(meth)acrylate/(meth)acrylic acid and poly(styrene/butyl(meth)acrylate/(meth)acrylic acid are preferred as second hardeners.

Development can take place at temperatures from 20° to 100° C. Suitable developers are the abovementioned solvents and also alcohols, such as methanol, ethanol, propanol, butanol, methylcellosolve, ethylene glycol monomethyl, monoethyl, monopropyl or monobutyl ether, carboxamides and lactams, such as formamide, acetamide, N-methylformamide, N,N-dimethylformamide, N,N-dimethylacetamide, N,N-diethylacetamide, γ-butyrolactam, ξ-caprolactam, N-methylpyrrolidine, N-methylcaprolactam, tetramethylurea or hexamethylphosphoramide, primary, secondary and tertiary amines, such as methylamine, ethylamine, propylamine, butylamine, pyrrolidine, piperidine, morpholine, dimethylamine, diethylamine, methylethylamine, trimethylamine, triethylamine, N-methylpyrrolidine, N-methylpiperidine or N-methylmorpholine. It is advantageous to use mixtures of such solvents.

The heat treatment or the hardening is generally carried out at temperatures of 50° to 200° C., preferably 60° to 150° C., depending on the intended use.

The coating agent of the invention produces images of high resolution and good quality. The protective coatings or images have the excellent mechanical, thermal and electrical properties inherent in epoxy resins. Particularly noteworthy is the high specific volume resistance. Owing to its long shelf life, the coating agent can also be marketed as a one-component system which can ultimately be hardened with light and heat.

The following examples explain the invention in more detail. The abbreviation pbw stands for parts by weight.

EXAMPLE 1

A coating solution is prepared from
48.0 pbw of a 50% solution of an epoxy resin based on bisphenol A and epichlorohydrin, in ethylglycol acetate (epoxide value: 0.25–0.42 equivalents/kg; softening point: 100°–110° C.; average molecular weight: 3,230),
15.0 pbw of a 40% solution of a high-molecular weight epoxy resin based on bisphenol A and epichlorohydrin, in methyl ethyl ketone (DIN 53,015 viscosity at 25° C.: 620–1,070 mPas, average molecular weight: about 52,000; epoxide value: 0.11–0.14 equivalents/kg);
20.0 pbw of 1,1,1-trimethylolpropane triacrylate
0.4 pbw of benzoin,
0.4 pbw of Michler's ketone,
8.0 pbw of a dye solution which consists of
  195.15 pbw of methylglycol,
  3.35 pbw of a blue dye of the type Solvent Blue 67 and
  1.50 pbw of a flow-control agent (Barolev-III), and
0.26 pbw of benzotriazole and is applied with a wire bar to a cleaned base material which is copper-clad on both sides and which has been provided with conducting paths and plated-through drilled holes, and is dried. The weight of the dry layer is 30 g/m².

The layer is subjected to imagewise exposure through a photomask covering the drilled holes under a 5 kw metal halide lamp for 60 seconds, is then heat-treated at 135° C., and is then developed at 20° C. with a speed of 1.6 m/min in a conveyorized developing apparatus by means of a mixture of 50 pbw of propylene carbonate,
30 pbw of diethylene glycol n-butyl ether and
20 pbw of γ-butyrolactone.

Subsequent soldering (270° C. for 10 seconds) turns the bared drilled holes into satisfactory soldering eyes.

The soldering stop mask's specific volume resistance as measured in accordance with DIN 53,482 is $1 \times 10^{16}$ ohm·cm.

EXAMPLE 2

6.0 pbw of a 10% solution of dicyanodiamide in methylglycol are added to a coating solution as in Example 1, and the mixture is processed as in Example 1.

As in Example 1, the heat-treated non-image areas are easily developed and constitute, after soldering, defect-free soldering eyes.

The mask's specific volume resistance as measured in accordane with DIN 53,482 is $1 \times 10^{16}$ ohm·cm.

EXAMPLE 3

A coating solution as in Example 1 whose viscosity at 25° C. is 740 mPas is applied by curtain-coating to a cleaned base material which is copper-clad on both sides and has been provided with conducting paths and plated-through drilled holes, and is dried. The weight of the dry layer is 30 g/m².

The layer is first flash exposed for 3 seconds over its entire area under a 5 kw metal halide lamp, and is then subjected to imagewise exposure under a suitable photomask for 40 seconds.

It is then developed by means of cyclohexanone and soldered at 270° C. for 10 seconds. The soldered junctions are defect-free.

EXAMPLE 4

A coating solution is prepared from
19.20 pbw of a 50% epoxy resin solution as in Example 1,
7.50 pbw of a 40% epoxy resin solution as in Example 1,
3.20 pbw of a 75% epoxy resin solution (based on bisphenol A, tetrabromobisphenol A and epichlorohydrin; epoxide value: 2.0–2.2 equivalents/kg: bromine content: 21.2%±2 on solid resin, average molecular weight: 2,300) in ethylglycol acetate,
10.0 pbw of 1,1,1-trimethylolpropane triacrylate,
0.2 pbw of benzoin,
0.2 pbw of Michler's ketone,
4.0 pbw of the dye solution described in Example 1,
0.13 pbw of benzotriazole and
1.44 pbw of a 10% solution of dicyanodiamide in methylglycol and is applied as a coating, exposed and heat-treated, the latter three steps being carried out according to Example 1.

It is then developed at 27° C. with 0.8 m/min in a continuous developing apparatus by means of the developer described in Example 1, and is then soldered at 270° C. for 10 seconds.

The soldered junctions are defect-free.

Specific volume resistance in accordance with DIN 53,482: $1 \times 10^{15}$ ohm·cm.

EXAMPLE 5

A coating solution is prepared from
9.44 pbw of a 50% solution of an epoxy resin based on bisphenol A and epichlorohydrin, in ethylglycol acetate (epoxide value: 0.25–0.42 equivalents/kg; softening point: 110°–110° C.; average molecular weight: 3,230),
3.75 pbw of a 40% solution of a high-molecular epoxy resin based on bisphenol A and epichlorohydrin, in methyl ethyl ketone (DIN 53,015 viscosity at 25° C.: 620–1,070 mPa s; average molecular weight: about 52,000; epoxide value: 0.11–0.14 equivalents/kg),
5.0 pbw of 1,1,1-trimethylolpropane triacrylate,
0.1 pbw of benzoin,
0.1 pbw of Michler's ketone,
2.0 pbw of the dye solution described in Example 1,
1.5 pbw of a 10% solution of dicyanodiamide in methylglycol and
7.1 pbw of a delustring paste which is composed of
  17.9 pbw of an epoxy resin with an epoxide value of 0.25–0.42 equivalents/kg according to Example 1
  36.6 pbw of talc and
  45.5 pbw of ethylglycol acetate and is applied with a wire bar to a cleaned circuit card which has been provided with conducting paths, and is dried.

The layer is first flash exposed to 3 seconds over its entire area under a 5 kw metal halide lamp and is then subjected to imagewise exposure under a suitable photomask for 40 seconds.

It is developed by means of cyclohexanone in the course of 60 seconds and then heat-treated at 130°–135° C. for 1 hour.

The photoresist mask which is wave soldered at 260° C. is defect-free, the soldering eyes having been well-formed.

The DIN 53,151 cross-hatch test carried out on the photoresist mask gives a Gt value of 0.

EXAMPLE 6

A coating solution as in Example 1 is whirler-coated to a coating thickness of about 5 g/m² onto 0.1 mm thick electrolytically grained aluminium, and dried. The layer is then exposed through a photomask under a 5 kw metal halide lamp for 60 seconds and is then developed by means of cyclohexanone in the course of 40 seconds.

The layers are then rinsed with water, fixed by wiping with 1% phosphoric acid and the surface is preserved by means of an aqueous gum arabic solution.

The resulting printing form is suitable for offset printing and gives at least 100,000 defect-free copies.

EXAMPLE 7

A coating solution as in Example 1 is whirler-coated ono a copper-clad base material known in the manufacture of printed circuit boards, and is dried.

It is then exposed through a circuit original under a 5 kw metal halide lamp and then developed by means of cyclohexanone.

It is etched with a commercially available Fe(III)-chloride etching solution to which the crosslinked image areas are resistant.

EXAMPLE 8

A coating solution is prepared from 19.20 pbw of a 50% epoxy resin solution as in Example 1 (epoxide value: 0.25–0.42 equivalents/kg; and softening point: 100°–110° C.; average molecular weight: 3,230), 7.50 pbw of a 40% epoxy resin solution as in Example 1, 16.80 pbw of a delustring paste obtained by grinding
  214.5 pbw of a 33.3% solution of a poly(methyl methacrylate/methacrylic acid) (acid value: 60 mg of KOH/g of polymer; and average molecular weight: 16,000) in methyl glycol,
  142.5 pbw of talcum powder,
  3.0 pbw of γ-glycidyloxypropyl-trimethoxysilane and
  3.0 pbw of deionised water in
  137.0 pbw of cyclohexanone, 10.0 pbw of 1,1,1-trimethylolpropane triacrylate,
0.20 pbw of benzoin,
0.20 pbw of Michler's ketone,
4.00 pbw of a dye solution which consists of
  195.15 pbw of methylglycol,
  3.35 pbw of a blue dye of the Solvent Blue 67 type and
  1.50 pbw of a flow-control agent (Barolev III),
0.13 pbw of benzotriazole and
2.50 pbw of a hardener mixture prepared from
  100 pbw of dicyanodiamide,
  20 pbw of chlorotolurone,
  5 pbw of triethanolamine and
  1.375 pbw of methylglycol, and is wire bar-coated onto a cleaned base material which is copper-clad on both sides and has been provided with conducting paths and plated-through drilled holes, and is dried. The weight of the dry layer is about 30 g/m².

The photoresist layer is then subjected to imagewise exposure through a photomask covering the drilled holes under a 5 kw metal halide lamp for 60 seconds, is then developed at 27° C. with a speed of 0.8 m/min in a conveyorized developing apparatus by means of a mixture of
  50 pbw of propylene carbonate,
  30 pbw of diethylene glycol n-butyl ether and
  20 pbw of γ-butyrolactone,
and is then thermally hardened at 135° C. for 1 hour.

Subsequent soldering (270° C. for 10 seconds) turns the bared drilled holes into defect-free soldering eyes.

The soldering stop mask's volume resistance as measured in accordance with DIN 53,481 is $1 \times 10^{15}$ ohm·cm.

EXAMPLE 9

A coating solution is made up of the individual components 172.26 pbw of a solid epoxy resin as defined in Example 1 (epoxide value: 0.25–0.42 equivalents/kg).

53.83 pbw of a high-molecular weight epoxy resin based on bisphenol A and epichlorohydrin whose 32% solution in ethylglycol acetate at 25° C. has a DIN 53,015 viscosity of 1,240–2,700 mPa s; average molecular weight: about 34,500; epoxide value: 0.11–0.14 equivalents/kg), 43.06 pbw of poly(methyl methacrylate/methacrylic acid), (9:1) [P(MMA/MAA)], 179.46 pbw of 1,1,1-trimethylolpropane triacrylate, 7.17 pbw of 2-tert.-butylanthraquinone/Michler's ketone (1:1), 2.33 pbw of benzotriazole 5.38 pbw of dicyanodiamide/chlorotolurone (5:1)

1.26 pbw of the dye solvent blue 67, 0.71 pbw of the flow-control agent Barolev III, 42.88 pbw of talc as a delustrant, 0.90 pbw of γ-glycidyloxypropyl-trimethoxysilane and 490.76 pbw of ethylglycol acetate+methylglycol, as solvents and is curtain-coated onto a cleaned base material which is copper-clad on both sides and has been provided with conductor paths, and is dried.

The weight of the dry layer is 25–35 g/m².

The layer is exposed through a photomask under a 5 kw metal halide lamp for 40 seconds, is developed at 20° C. with 1.6 m/min by means of the developer described in Example 8, and is then thermally hardened at 135° C. in the course of 1 hour.

The printed circuit coated with the hardened photoresist mask is soldered by passage at 260° C. over a customary soldering wave.

Spared conducting paths and bared drilled holes display defect-free soldering.

Replacing the abovementioned P(MMA/MAA), (9:1) by a P(MMA/MAA) which has an acid value of 156 mg of KOH/g of polymer, or by a P(MMA/MAA) which has an acid value of 176 mg of KOH/g of polymer, gives solder masks having equally good properties.

EXAMPLE 10

The hardened resist images described in Examples 8 and 9 are wiped 20 times with an acetone-saturated cotton wool wad. The copper surface of the conductor diagram cannot be bared by means of this method, and demonstrates the resistance of the resist mask against an organic solvent.

Samples dipped into methylene chloride are stable in the liquid for more than 120 seconds, which argues for a high degree of crosslinking in the resist layer.

The thickness of the two resist masks described in Examples 8 and 9 is measured before and after development with no change, which again demonstrates the resistance of said masks.

EXAMPLE 11

A coating solution according to example 8 is applied to a dry thickness of about 5 g/m² to electrolytically grained and anodised aluminium, and dried.

The layer is then exposed under a 5 kw metal halide lamp, developed in a spray developer by means of cyclohexanone, rinsed with water and dried. The layer is then hardened at 200° C. in the course of 5 minutes, and the surface is acidified by wiping with 1% phosphoric acid and preserved by means of an aqueous gum arabic solution.

The resulting printing forme is particularly abrasion-resistant, and is suitable for offset printing, where it gives at least 100,000 defect-free copies.

EXAMPLE 12

A coating solution is prepared from 38.40 pbw of a 50% epoxy resin solution as in Example 1 (epoxide value: 0.25–0.42 equivalents/kg; softening point: 100°–110° C.; average molecular weight: 3,230), 18.75 pbw of a 32% solution of high-molecular weight epoxy resin based on bisphenol A and epichlorohydrin in ethylglycol acetate (DIN 53,015 viscosity at 25° C.: 1,240–2,700 mPa s; average molecular weight: about 34,500; epoxide value: 0.11-0.41 equivalents/kg), 24.20 pbw of a delustring paste prepared by grinding
  857.0 pbw of a 25% solution of a poly(methyl methacrylate/butyl methacrylate/methacrylic acid) (45:45:10; acid value: 59 mg of KOH/g of polymer) in cyclohexanone,
  4.5 pbw of γ-glycidyloxypropyl-trimethoxysilane,
  107.0 pbw of talcum powder,
  107.0 pbw of Al$_2$O$_3$ and
  4.5 pbw of deionised water,
20.00 pbw of 1,1,1-trimethylolpropane triacrylate,
0.80 pbw of 2-tert.-butylanthraquinone/Michler's ketone (1:1),
8.00 pbw of a dye solution as in Example 8,
0.26 pbw of benzotriazole and
5.00 pbw of a hardener mixture as in Example 8 and is wire bar-coated onto a cleaned base material which is copper-clad on both sides and has been provided with conducting paths and plated-through drilled holes, and is dried.

The resist layer is then subjected to imagewise exposure for 60 seconds and is then developed at 27° C. with a speed of 3.0 m/min in a conveyorized developing apparatus by means of the developer described in Example 8.

The layers are hardened at 135° C. for 1 hour.

After soldering (270° C. for 10 seconds), the spared conducting paths and bared drilled holes have a defect-free appearance.

Replacing the terpolymer P(MMA/BuMA/MAA) (45:45:10) by the terpolymer poly(styrene/butyl methacrylate/methacrylic acid) (25:60:15) which has an acid value of 154 mg of KOH/g of polymer, also gives a solder mask having excellent properties.

EXAMPLE 13

A coating solution prepared as in Example 9, is admixed with 6% of antimony(III)oxide, based on solids content, and is ground.

A solder mask prepared with this solution and processed in a conventional manner has well-formed, defect-free soldering eyes.

EXAMPLE 14

A coating solution is prepared from
40.80 pbw of a 50% solution of an epoxy resin based on a cresol novolak and epichlorohydrin in methylglycol (epoxide value: 0.425 equivalents/kg; softening point: 90° C.; average molecular weight: 1,600),
18.75 pbw of a 32% solution of a high-molecular weight epoxy resin based on bisphenol A and epichlorohydrin in ethylglycol acetate (DIN 53,015 viscosity at 25° C.: 1,240-2,700 mPa s; average molecular weight: about 34,500; epoxide value: 0.11-0.41 equivalents/kg),
25.20 pbw of a delustring paste prepared by grinding
  321.75 pbw of a 33.3% solution of a poly(methyl/methacrylate/methacrylic acid) (acid value: 156 mg of KOH/g of polymer) in methylglycol,
  4.5 pbw of γ-glycidyloxypropyl-trimethoxysilane,
  213,75 pbw of the Ultra mix talcum powder,
  4.5 pbw of deionised water and
  205.50 pbw of cyclohexanone,
20.00 pbw of 1,1,1-trimethylolpropane triacrylate,
0.80 pbw of 2-tert.-butylanthraquinone/Michler's ketone (1:1),
8.00 pbw of a dye solution as in Example 8,
0.26 pbw of benzotriazole and
5.00 pbw of a hardener mixture as in Example 8 and is applied in the manner of Example 13 to a base material which is copper-clad on both sides.

The dried resist layer is flash exposed over its entire area for 3 seconds and is then subjected to imagewise exposure for 60 seconds.

The layer is developed by means of a brush in the manner of Example 1 at room temperature for 3 minutes, and is then hardened at 130°-135° C. in the course of 1 hour.

After soldering (270° C. for 10 seconds), the spared conducting paths have a defect-free appearance.

What is claimed is:

1. A process for preparing a relief image on a support material which comprises
  exposing a material which has been coated with a layer of a photopolymerizable coating agent which comprises
    (a) at least one uncured epoxy resin based on a bisphenol or a novolac and epichlorohydrin, and having an epoxide value of 0.2 to 0.5 equivalents per kg of resin and an average molecular weight of 1,000 to 10,000,
    (b) at least one uncured epoxy resin based on a bisphenol or a novolac and epichlorohydrin, and having an average molecular weight of 20,000 to 60,000, the weight ratio of a:b being from 8:1 to 3:1,
    (c) at least one light-sensitive, polyethylenically unsaturated monomer having terminal ethylene groups, and
    (d) at least one photoinitiator or at least one sensitizer or a mixture of at least one photoinitiator and at least one sensitizer, through a photomask, and then
  removing the unexposed areas by means of a developer.

2. A process according to claim 1 wherein the coating agent is dissolved in an organic solvent.

3. A process according to claim 1 wherein in the coating agent the unsaturated monomer (c) is an acrylate or methacrylate of a polyol.

4. A process according to claim 3 wherein the unsaturated monomer (c) is 1,1,1-trimethylolprropane triacrylate or trimethacrylate.

5. A process according to claim 1 where in the coating agent the weight ratio of the epoxy resins (a)+(b) to the monomer (c) ranges from 1:9 to 9:1.

6. A process according to claim 5 wherein the weight ratio of the epoxy resins (a)+(b) to the monomer (c) ranges from 1:9 to 7:3.

7. A process according to claim 1 wherein the coating agent additionally contains a hardener for the epoxy resins selected from the group consisting of dicyandiamide, polybasic carboxylic acids, anhydrides of polybasic carboxylic acids and mixtures of the said hardeners with mono-, di- or triethanolamine, alone or together with a hardening accelerator.

8. A process according to claim 7 wherein the coating agent additionally contains a polymer containing acid groups, as a second hardener.

9. A process according to claim 8 wherein the polymer has an acid value of 10 to 500 mg of KOH/g of polymer.

10. A process according to claim 1 wherein the relief image obtained is hardened by means of a post-heat treatment before development.

11. A process according to claim 1, wherein the relief image obtained is hardened by means of a post-heat treatment after development.

* * * * *